United States Patent
Rosenberg et al.

(10) Patent No.: US 6,211,861 B1
(45) Date of Patent: Apr. 3, 2001

(54) TACTILE MOUSE DEVICE

(75) Inventors: Louis B. Rosenberg, San Jose; Kenneth M. Martin, Palo Alto, both of CA (US)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 09/456,887

(22) Filed: Dec. 7, 1999

Related U.S. Application Data

(63) Continuation-in-part of application No. 09/103,281, filed on Jun. 23, 1998, now Pat. No. 6,088,019.

(51) Int. Cl.[7] .................................................. G09G 5/08

(52) U.S. Cl. ............................................................ 345/163

(58) Field of Search .................................... 345/163, 161, 345/156, 157, 164

(56) References Cited

U.S. PATENT DOCUMENTS

| | | | |
|---|---|---|---|
| 3,919,691 | 11/1975 | Noll | 340/172.5 |
| 4,787,051 | 11/1988 | Olson | 364/518 |
| 4,795,296 | 1/1989 | Jau | 414/5 |
| 4,868,549 | 9/1989 | Affinito et al. | 340/710 |
| 4,896,554 | 1/1990 | Culver | 74/471 XY |
| 4,949,119 | 8/1990 | Moncrief et al. | 364/578 |
| 5,044,956 | 9/1991 | Behensky et al. | 434/45 |
| 5,107,262 | 4/1992 | Cadoz et al. | 341/22 |
| 5,146,566 | 9/1992 | Hollis, Jr. et al. | 395/275 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,203,563 | 4/1993 | Loper, III | 273/148 B |

(List continued on next page.)

FOREIGN PATENT DOCUMENTS

| | | |
|---|---|---|
| 0 265 011 A1 | 4/1988 | (EP) . |
| 0 607 580 A1 | 7/1994 | (EP) . |
| 0 626 634 A2 | 11/1994 | (EP) . |
| WO 92/00559 | 1/1992 | (WO) . |
| WO 95/20788 | 8/1995 | (WO) . |
| WO 97/21160 | 6/1997 | (WO) . |
| WO 97/31333 | 8/1997 | (WO) . |
| WO 00/03319 | 1/2000 | (WO) . |
| WO 00/21071 | 4/2000 | (WO) . |

OTHER PUBLICATIONS

Buttolo et al., "Pen–Based Force Display for Precision Manipulation in Virtual Environments," 0–8186–7084 IEEE Mar. 1995, pp. 217–224.

Rosenberg et al., "The Use of Force Feedback to Enhance Graphical User Interfaces," Stereoscopic Displays & Virtual Reality Systems III (1996), Proc. SPIE 2653, pp. 243–248.

Schmult et al., "Application Areas for A Force–Feedback Joystick," DSC–vol. 49, Advances in Robotics, Mechatronics, and Haptic Interfaces, ASME 1993, pp. 47–54.

(List continued on next page.)

*Primary Examiner*—Richard Hjerpe
*Assistant Examiner*—Ronald Laneau
(74) *Attorney, Agent, or Firm*—James R. Riegel

(57) ABSTRACT

A low-cost tactile feedback mouse device for providing haptic feedback to a user for enhancing interactions and manipulations in a graphical environment provided by a computer. The mouse device includes a sensor device able to detect the movement of the mouse in the planar workspace. An actuator is coupled to the housing of the mouse and applies an inertial force in a particular degree of freedom, preferably along an axis perpendicular to the planar workspace, where the inertial force is transmitted through the housing to the user. The actuator outputs the inertial force preferably by linearly moving an inertial mass along the Z-axis. The output force is correlated with interaction of a controlled graphical object, such as a cursor, with other graphical objects in a graphical environment displayed by the host computer. The inertial force can be a pulse, vibration, texture force, or other type of force.

68 Claims, 6 Drawing Sheets

U.S. PATENT DOCUMENTS

| | | | |
|---|---|---|---|
| 5,220,260 | 6/1993 | Schuler | 318/561 |
| 5,296,871 * | 3/1994 | Paley | 345/163 |
| 5,355,148 | 10/1994 | Anderson | 345/166 |
| 5,388,992 | 2/1995 | Franklin et al. | 434/114 |
| 5,399,091 | 3/1995 | Misumoto | 434/61 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,506,605 * | 4/1996 | Paley | 345/163 |
| 5,542,672 | 8/1996 | Meredith | 463/37 |
| 5,550,562 | 8/1996 | Aoki et al. | 345/163 |
| 5,565,840 | 10/1996 | Thorner et al. | 340/407.1 |
| 5,583,478 | 12/1996 | Renzi | 340/407.1 |
| 5,589,828 | 12/1996 | Armstrong | 341/20 |
| 5,589,854 | 12/1996 | Tsai | 345/161 |
| 5,625,576 | 4/1997 | Massie et al. | 364/578 |
| 5,629,594 | 5/1997 | Jacobus et al. | 318/568.11 |
| 5,643,087 | 7/1997 | Marcus et al. | 463/38 |
| 5,666,138 | 9/1997 | Culver | 345/161 |
| 5,684,722 | 11/1997 | Thorner et al. | 364/578 |
| 5,696,537 | 12/1997 | Solhjell | 345/164 |
| 5,709,219 | 1/1998 | Chen et al. | 128/782 |
| 5,714,978 | 2/1998 | Yamanaka et al. | 345/157 |
| 5,734,373 | 3/1998 | Rosenberg et al. | 345/161 |
| 5,736,978 | 4/1998 | Hasser et al. | 345/173 |
| 5,742,278 | 4/1998 | Chen et al. | 345/156 |
| 5,754,023 | 5/1998 | Roston et al. | 318/561 |
| 5,781,172 | 7/1998 | Engel et al. | 345/164 |
| 5,784,052 | 7/1998 | Keyson | 345/167 |
| 5,790,108 | 8/1998 | Salcudean et al. | 345/184 |
| 5,802,353 | 9/1998 | Avila et al. | 395/500 |
| 5,825,308 | 10/1998 | Rosenberg | 341/20 |
| 5,844,392 | 12/1998 | Peurach et al. | 318/568.17 |
| 5,857,986 | 1/1999 | Moriyasu | 601/49 |
| 5,880,714 | 3/1999 | Rosenberg et al. | 345/161 |
| 5,889,672 | 3/1999 | Schuler et al. | 364/188 |
| 5,897,437 | 4/1999 | Nishiumi et al. | 463/47 |
| 5,914,705 * | 6/1999 | Johnson et al. | 345/163 |
| 5,944,151 | 8/1999 | Jakobs et al. | 188/267.1 |
| 5,956,484 | 9/1999 | Rosenberg et al. | 395/200.33 |
| 5,959,613 | 9/1999 | Rosenberg et al. | 345/161 |
| 5,973,689 | 10/1999 | Gallery | 345/339 |
| 5,986,643 | 11/1999 | Harvill et al. | 345/156 |
| 5,990,869 * | 11/1999 | Kubica et al. | 345/163 |
| 6,001,014 | 12/1999 | Ogata et al. | 463/37 |
| 6,004,134 | 12/1999 | Marcus et al. | 434/45 |
| 6,005,551 | 12/1999 | Osborne et al. | 345/161 |
| 6,020,876 | 2/2000 | Rosenberg et al. | 345/157 |
| 6,028,593 | 2/2000 | Rosenberg et al. | 345/156 |
| 6,061,004 | 5/2000 | Rosenberg | 341/20 |
| 6,078,308 | 6/2000 | Rosenberg et al. | 345/145 |
| 6,088,017 | 7/2000 | Tremblay et al. | 345/156 |
| 6,088,019 | 7/2000 | Rosenberg | 345/156 |
| 6,100,874 | 8/2000 | Schena et al. | 345/157 |

OTHER PUBLICATIONS

Ellis et al., "Design and Evaluation of a High–Performance Prototype Planar Haptic Interface," DSC–vol. 49, Advances in Robotics, Mechatronics, and Haptic Interfaces, ASME Dec. 1993, pp. 55–65.

Hannaford et al., "Force–Feedback Cursor Control," NASA Tech Brief, vol. 13, No. 11, Item #21, Jet Propulsion Lab., Nov. 1989.

Kelley et al., "On the Development of a Force–Feedback Mouse and Its Integration Into a Graphical User Interface," Symp. on Haptic Interfaces for Virtual Envir. and Teleoperator Systems, 1994 Int'l Mech. Eng. Congress and Exhibition, Nov. 1994.

Iwata, H., "Artificial Reality with Force–Feedback: Development of Desktop Virtual Space with Compact Master Manipulator," Computer Graphics, vol. 24, No. 4, Aug. 1990, pp. 165–170.

Ramstein et al., "The Pantograph: A Large Workspace Haptic Device for a Multimodal Human–Computer Interaction," Computer–Human Interaction, CHI'94.

Rosenberg et al., "Commercially Viable Force Feedback Controller for Individuals with Neuromotor Disabilities," USAF Armstrong Lab., May 1996.

Su et al., "The Virtual Panel Architecture: A 3D Gesture Framework," Computer Science Depts., Univ. of Maryland, Texas A&M Univ., Jan. 1993.

Adachi et al., "Sensory Evaluation of Virtual Haptic Push–Buttons," Technical Research Center, Suzuki Motor Corp., 1994.

Rosenberg, L., "A Force Feedback Programming Primer—For PC Gaming Peripherals Supporting I–Force 2.0 and Direct—X 5.0," Immersion Corporation, 1997.

Hasser, C., "Tactile Feedback For a Force–Reflecting Haptic Display," School of Engineering, Univ. of Dayton, Dec. 1995.

Hasser, C. et al., "Tactile Feedback With Adaptive Controller for a Force–Reflecting Haptic Display—Part 1: Design," IEEE 0–7803–3131, Jan. 1996.

Dennerlein, Jack T. et al., "Vibrotactile Feedback for Industrial Telemanipulators," 6th Ann. Symposium on Haptic Interfaces for Virtual Environment and Teleoperator Systems, ASME IMECE, Nov. 1997.

Akamatsu, M. et al., "Multimodal Mouse: A Mouse–Type Device With Tactile and Force Display," Presence, vol. 3, No. 4, Winter 1994, pp. 73–80.

Kelley, A.J. et al., "MagicMouse: Tactile and Kinesthetic Feedback in the Human–Computer Interface Using an Electromagnetically Actuated Input/Output Device," Dept. of Elec. Eng., Univ. of British Columbia, Oct. 1993, pp. 1–27.

Ramstein, C., "Combining Haptic and Braille Technologies: Design Issues and Pilot Study," ACM 0–89791–776 Jun. 1996, pp. 37–44.

Payette, J. et al., "Evaluation of a Force Feedback (Haptic) Computer Pointing Device in Zero Gravity," DSC–vol. 58, Proc. of ASME Dynamics Systems and Control Division, ASME 1996, pp. 547–553.

Wiker, S. et al., "Development of Tactile Mice for Blind Access to Computers: Importance of Stimulation Locus, Object Size, and Vibrotactile Display Resolution," Proc. of Human Factors Society 35th Annual Meeting 1991, pp. 708–712.

* cited by examiner

TACTILE MOUSE DEVICE

CROSS REFERENCE TO RELATED APPLICATIONS

This application is a continuation-in-part of parent patent applications:

Application Ser. No. 09/103,281, now U.S. Pat. No. 6,088,019, filed Jun. 23, 1998 on behalf of Louis Rosenberg, entitled, "Low Cost Force Feedback Device with Actuator for Non-Primary Axis," and Application Ser. No. 09/253,132, filed Feb. 18, 1999 on behalf of Louis Rosenberg, entitled, "Low Cost Force Feedback Pointing Device," both assigned to the assignee of this present application, and both of which are incorporated by reference herein in their entirety.

BACKGROUND OF THE INVENTION

The present invention relates generally to interface devices for allowing humans to interface with computer systems, and more particularly to computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), etc. Common human-computer interface devices used for such interaction include a mouse, joystick, trackball, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor or other graphical object in a graphical environment, where the location of the cursor is responsive to the motion of the user object.

In some interface devices, force feedback or tactile feedback is also provided to the user, more generally known herein as "haptic feedback." These types of interface devices can provide physical sensations which are felt by the user manipulating a user manipulandum of the interface device. One or more motors or other actuators are coupled to the joystick or mouse and are connected to the controlling computer system. The computer system controls forces on the joystick or mouse in conjunction and coordinated with displayed events and interactions by sending control signals or commands to the actuators. The computer system can thus convey physical force sensations to the user in conjunction with other supplied feedback as the user is grasping or contacting the interface device or manipulatable object of the interface device. For example, when the user moves the manipulatable object and causes a displayed cursor to interact with a different displayed graphical object, the computer can issue a command that causes the actuator to output a force on the physical object, conveying a feel sensation to the user.

One problem with current force feedback controllers in the home consumer market is the high manufacturing cost of such devices, which makes the devices expensive for the consumer. A large part of this manufacturing expense is due to the inclusion of multiple actuators and corresponding control electronics in the force feedback device. In addition, high quality mechanical and force transmission components such as linkages and bearings must be provided to accurately transmit forces from the actuators to the user manipulandum and to allow accurate sensing of the motion of the user object. These components are complex and require greater precision in their manufacture than many of the other components in an interface device, and thus further add to the cost of the device. A need therefore exists for a force feedback device that is lower in cost to manufacture yet offers the user force feedback to enhance the interaction with computer applications.

SUMMARY OF THE INVENTION

The present invention is directed to a low-cost tactile feedback mouse device connected to a computer system, the mouse device having a simple actuator for low cost force feedback for enhancing interactions and manipulations in a displayed graphical environment.

More specifically, the present invention relates to a haptic feedback interface device that is coupled to a host computer which implements a host application program. In a preferred embodiment, the device is a mouse that is physically contacted by a user and movable in a planar workspace. The mouse includes a housing and a sensor device able to detect the movement of the mouse in the planar workspace and to output sensor signals representative of that movement. An actuator is coupled to the housing of the mouse and applies an inertial force in a particular degree of freedom, preferably approximately along an axis perpendicular to the planar workspace, where the inertial force is transmitted through the housing to the user contacting the housing. Preferably, the actuator outputs said inertial force to the housing by moving an inertial mass. The actuator can be a linear actuator, such as a voice coil actuator, that moves the inertial mass bi-directionally along a linear axis that is substantially perpendicular to the planar workspace; or a rotary actuator that rotates a shaft and provides an approximately linear inertial force.

The output force is preferably correlated with interaction of a controlled cursor with other graphical objects or areas in a graphical environment displayed by the host computer. The force can be a pulse, vibration, texture force, or other type of force. A local microprocessor, separate from the host computer, can receive host signals or commands from said host computer and output force signals to the actuator for controlling the inertial force, receive and process sensor signals, and report locative data to the host computer derived from the sensor signals. The sensor device can include a ball that frictionally contacts the surface under the mouse or can include an optical sensor that detects motion of the surface relative to the mouse housing. A method for providing haptic feedback similarly includes detecting motion of the mouse device in a planar workspace, receiving information from the host computer indicating that a tactile sensation is to be output, and outputting an inertial force on the housing of the mouse device along an axis substantially perpendicular to the planar workspace, where the inertial force is caused by moving an inertial mass coupled to an actuator.

The present invention advantageously provides a haptic feedback device that is significantly lower in cost than other types of haptic feedback devices and is thus quite suitable for home consumer applications. A single actuator can be provided that applies inertial force in a particular degree of freedom, such as the Z-axis perpendicular to the X-Y plane of mouse movement. This allows crisp forces to be output without interfering with the motion or control of the mouse in the X-Y plane, and also enhances the user's experience of a third dimension relative to the mouse workspace. Furthermore, the actuator of the present invention can provide a variety of different types of force sensations to enhance the user's interfacing and experience with a computer application.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
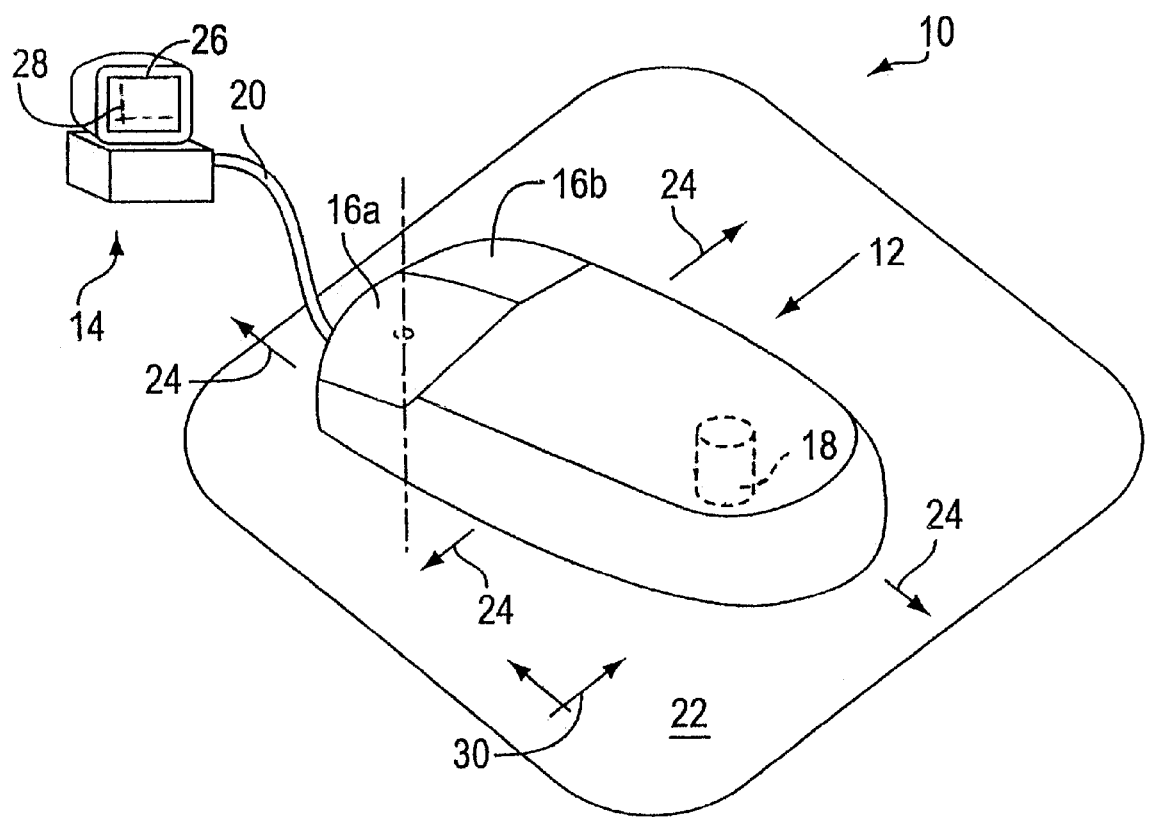
FIG. 1 is a perspective view of a mouse of the present invention connected to a host computer.

FIG. 1 is a perspective view of a haptic feedback mouse interface system 10 of the present invention capable of providing input to a host computer based on the user's manipulation of the mouse and capable of providing haptic feedback to the user of the mouse system based on events occurring in a program implemented by the host computer. Mouse system 10 includes a mouse 12 and a host computer 14. It should be noted that the term "mouse" as used herein, indicates an object generally shaped to be grasped or contacted from above and moved within a substantially planar workspace (and additional degrees of freedom if available). Typically, a mouse is a smooth or angular shaped compact unit that snugly fits under a user's hand, fingers, and/or palm, but can also be implemented as a grip, finger cradle, cylinder, sphere, planar object, etc.

Mouse 12 is an object that is preferably grasped or gripped and manipulated by a user. By "grasp," it is meant that users may releasably engage a portion of the object in some fashion, such as by hand, with their fingertips, etc. In the described embodiment, mouse 12 is shaped so that a user's fingers or hand may comfortably grasp the object and move it in the provided degrees of freedom in physical space. For example, a user can move mouse 12 to provide planar two-dimensional input to a computer system to correspondingly move a computer generated graphical object, such as a cursor or other image, in a graphical environment provided by computer 14 or to control a virtual character, vehicle, or other entity in a game or simulation. In addition, mouse 12 preferably includes one or more buttons 16a and 16b to allow the user to provide additional commands to the computer system. The mouse 12 may also include additional buttons. For example, a thumb button can be included on one side of the housing of mouse 12.

Mouse 12 preferably includes an actuator 18 which is operative to produce forces on the mouse 12. This operation is described in greater detail below with reference to FIG. 2.

Mouse 12 rests on a ground surface 22 such as a tabletop or mousepad. A user grasps the mouse 12 and moves the mouse in a planar workspace on the surface 22 as indicated by arrows 24. Mouse 12 may be moved anywhere on the ground surface 22, picked up and placed in a different location, etc. A frictional ball and roller assembly (not shown) can in some embodiments be provided on the underside of the mouse 12 to translate the planar motion of the mouse 12 into electrical position signals, which are sent to a host computer 14 over a bus 20 as is well known to those skilled in the art. In other embodiments, different mechanisms and/or electronics can be used to convert mouse motion to position or motion signals received by the host computer. Mouse 12 is preferably a relative device, in which its sensor detect a change in position of the mouse, allowing the mouse to be moved over any surface at any location. An absolute mouse may also be used, in which the absolute position of the mouse is known but the mouse is typically limited to a particular predefined workspace.

Mouse 12 is coupled to the computer 14 by a bus 20, which communicates signals between mouse 12 and computer 14 and may also, in some preferred embodiments, provide power to the mouse 12. Components such as actuator 18 require power that can be supplied from a conventional serial port or through an interface such as a USB or Firewire bus. In other embodiments, signals can be sent between mouse 12 and computer 14 by wireless transmission/reception. In some embodiments, the power for the actuator can be supplemented or solely supplied by a power storage device provided on the mouse, such as a capacitor or one or more batteries. Some embodiments of such are disclosed in U.S. Pat. No. 5,691,898, incorporated herein by reference.

Host computer 14 is preferably a personal computer or workstation, such as a PC compatible computer or Macintosh personal computer, or a Sun or Silicon Graphics workstation. For example, the computer 14 can operate under the Windows™, MacOS, Unix, or MS-DOS operating system. Alternatively, host computer system 14 can be one of a variety of home video game console systems commonly connected to a television set or other display, such as systems available from Nintendo, Sega, or Sony. In other embodiments, host computer system 14 can be a "set top box" which can be used, for example, to provide interactive television functions to users, or a "network-" or "internet-computer" which allows users to interact with a local or global network using standard connections and protocols such as used for the Internet and World Wide Web. Host computer preferably includes a host microprocessor, random access memory (RAM), read only memory (OM), input/output (I/O) circuitry, and other components of computers well-known to those skilled in the art.

Host computer 14 preferably implements a host application program with which a user is interacting via mouse 12 and other peripherals, if appropriate, and which may include force feedback functionality. For example, the host application program can be a video game, word processor or spreadsheet, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Linux, Be, etc. are also referred to as "application programs." In one preferred embodiment, an application program utilizes a graphical user interface (GUI) to present options to a user and receive input from the user. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. A displayed cursor or a simulated cockpit of an aircraft might be considered a graphical object. The host application program checks for input signals received from the electronics and sensors of mouse 12, and outputs force values and/or commands to be converted into forces output for mouse 12. Suitable software drivers which interface such simulation software with computer input/output (I/O) devices are available from Immersion Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display images from a GUI.

As shown in FIG. 1, the host computer may have its own "host frame" 28 which is displayed on the display screen 26. In contrast, the mouse 12 has its own workspace or "local frame" 30 in which the mouse 12 is moved. In a position control paradigm, the position (or change in position) of a user-controlled graphical object, such as a cursor, in host frame 28 corresponds to a position (or change in position) of the mouse 12 in the local frame 30. The offset between the object in the host frame and the object in the local frame can be changed by the user by indexing, i.e., moving the mouse while no change in input is provided to the host computer, such as by lifting the mouse from a surface and placing it down at a different location In alternative embodiments, the mouse can be a different interface or control device. For example, a hand-held remote control device used to select functions of a television, video cassette recorder, sound stereo, internet or network computer (e.g., Web-TV™), or a gamepad controller for video games or computer games, can be used with the haptic feedback components described herein. Handheld devices are not constrained to a planar workspace like a mouse but can still benefit from the directed inertial sensations described herein which, for example, can be output perpendicularly from the device's top surface.

Figure 2:
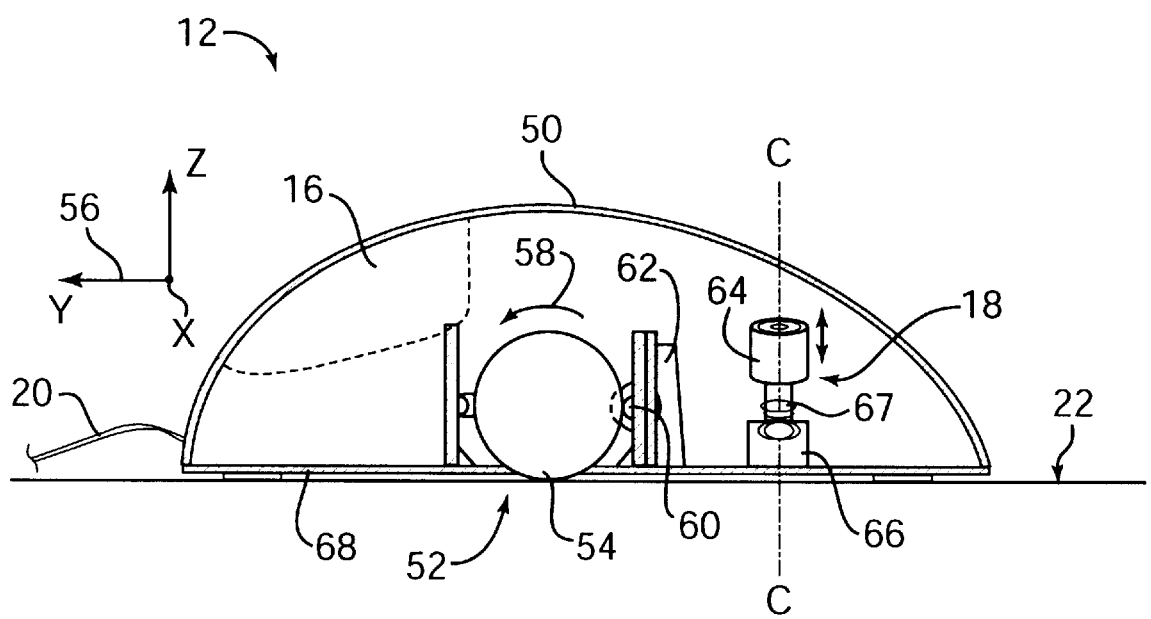
FIG. 2 is a side cross sectional view of the mouse of FIG. 1.

FIG. 2 is a side cross-sectional view of the mouse 12 of FIG. 1. Mouse 12 includes one or more actuators 18 for imparting haptic feedback such as tactile sensations to the user of the mouse. The actuator outputs forces on the mouse 12 which the user is able to feel.

In the preferred embodiment of the present invention, an actuator is coupled to an inertial mass that is moved by the actuator. The actuator is also coupled to the housing of the mouse such that inertial forces caused by the motion of the inertial mass are applied to the housing of the mouse with respect to the inertial mass, thereby conveying haptic feedback such as tactile sensations to the user of the mouse who is contacting the housing. Thus, the actuator does not directly output forces to the user or to a user-manipulatable object, but instead the moving mass creates an inertial force that is indirectly transmitted to the user. Some design considerations for such an inertially grounded actuator system are described below.

Using an inertial mass as the grounding reference for tactile sensation generation on an cursor control interface has numerous limitations. First and foremost, the magnitude of forces that can be output with respect to an inertial ground are not as high as can be output with respect to an earth ground. Of course, the larger the mass, the larger the forces that can be output, so the theoretical limit of force magnitude is very high. However, for practical reasons, very large masses cannot be used within a mouse device as the inertial ground, since large masses make the mouse device too heavy. Thus, the amount of force output that can be practically applied is limited.

Because large forces can not be applied through an inertial ground, it is desirable to compensate by using a high bandwidth actuator, i.e., an actuator that can output abrupt changers in force magnitude level. Since the human hand is more sensitive to changes in force level than to absolute force levels, a high bandwidth actuator used to convey low level forces produced with respect to an inertial ground can be quite effective in producing compelling tactile sensations.

One implementation that may be used for generating tactile sensations is a motor (or other actuator) having a rotating shaft, where an inertial mass is connected to the shaft at an off-center point of the mass. The inertial mass is rotated around the motor shaft with respect to the interface device at various speeds. This can create sinusoidal force signals at various frequencies depending upon the current driven through the motor. The problem with such a methodology is slow response time because the spinning mass must accelerate and decelerate over time to achieve the rotational velocity corresponding to a desired frequency output. Also, this implementation applies forces in a continually changing direction confined to the plane of rotation of the mass, providing a "wobble" sensation. This can be particularly disconcerting to the user at slow frequencies. Overall, the rotating eccentric inertial mass technique is highly limited in its ability to output force sensations.

A preferred embodiment creates inertial forces that are directed substantially in a particular degree of freedom, i.e. along a particular axis. The inertial forces can be created, for example, using a high bandwidth linear actuator; preferred actuators include a linear moving voice coil actuator and a linear moving-magnet actuator, which are suitable for high bandwidth actuation. A traditional servo motor used in a harmonic drive configuration can also be a suitable high bandwidth actuator. This embodiment allows for high fidelity control of force sensations in both the frequency and magnitude domains. This also allows the forces to be directed along a desired axis and allows for crisp tactile sensations that can be independently modulated in magnitude and frequency. Such crisp sensations cannot typically be achieved using a rotating mass, which provides an undirected inertial force in a rotating plane and creates a generalized wobble on the device.

In a linear actuator implementation, it is important to consider the direction or degree of freedom that the force is applied on the housing of the mouse device with respect to the inertial mass. If a significant component of the force is applied along one or more of the moveable planar degrees of freedom of the mouse (i.e., the X or Y axis) with respect to the inertial mass, the short pulse can jar the mouse in one or both of those planar degrees of freedom and thereby impair the user's ability to accurately guide a controlled graphical object, such as a cursor, to a given target. Since a primary function of a mouse is accurate targeting, a tactile sensation that distorts or impairs targeting, even mildly, is undesirable. To solve this problem, the mouse device of the present invention applies inertial forces substantially along the Z axis, orthogonal to the planar X and Y axes of the mouse controller. In such a novel configuration, tactile sensations can be applied at a perceptually strong level for the user without impairing the ability to accurately position a user controlled graphical object in the X and Y axes. Furthermore, since the tactile sensations are directed in a third degree of freedom relative to the two-dimensional mouse planar workspace and display screen, jolts or pulses output along the Z axis feel much more like three-dimensional bumps or divots to the user, increasing the realism of the tactile sensations and creating a more compelling interaction. For example, an upwardly-directed pulse that is output when the cursor is moved over a window border creates the illusion that the mouse is moving "over" a bump at the window border.

Alternatively, directed inertial forces can be output along the X and Y axes in the planar workspace of the device and can be compensated for to prevent or reduce interference with the user's control of the device. One method to compensate is to actively filter imparted jitter in that workspace, as disclosed in U.S. Pat. No. 6,020,876, incorporated herein by reference; however, this implementation may add complexity and cost to the mouse device.

In view of the above design factors, a preferred mouse embodiment 12 is shown in FIG. 2 including a linear actuator. Mouse 12 includes a housing 50, a sensing system 52, and an actuator 18. Housing 50 is shaped to fit the user's hand like a standard mouse while the user moves the mouse in the planar degrees of freedom and manipulates the buttons 16. Other housing shapes can be provided in many different embodiments.

Sensing system 52 detects the position of the mouse in its planar degrees of freedom, e.g. along the X and Y axes. In the described embodiment, sensing system 52 includes a standard mouse ball 54 for providing directional input to the computer system. Ball 45 is a sphere that extends partially out the bottom surface of the mouse and rolls in a direction corresponding to the motion of the mouse on a planar surface 22. For example, when the mouse 12 is moved in a direction indicated by arrow 56 (y direction), the ball rotates in place in a direction shown by arrow 58. The ball motion can be tracked by a cylindrical roller 60 which is coupled to a sensor 62 for detecting the motion of the mouse. A similar roller and sensor 28 can be used for the x-direction which is perpendicular to the y-axis.

Other types of mechanisms and/or electronics for detecting planar motion of the mouse 12 can be used in other embodiments. For example, in certain embodiments, high frequency, tactile sensations can be applied by the actuator that cause a mouse ball 45 to slip with respect to the frictionally engaged rollers. This is problematic, causing the mouse to be less accurate because of the tactile sensations. To remedy this problem, a more preferred embodiment employs the actuator 18 within an optical mouse that has no moving mouse ball component. A suitable optical mouse technology is made by Hewlett Packard of Palo Alto, Calif. and can be advantageously combined with the tactile sensation technologies described herein, where the optical sensor detects motion of the mouse relative to the planar support surface by optically taking and storing a number of images of the surface and comparing those images over time to determine if the mouse has moved. For example, the Intellimouse Explorer or Intellimouse with Intellieye mouse devices from Microsoft Corporation use this type of sensor. If a local microprocessor is employed (see FIG. 4), the control of the tactile element can be performed by the same local processor that controls the optical sensor technology, thereby reducing component costs (i.e., there is no need to have one processor for the optics and one processor for the tactile feedback). Alternatively, a portion of an optical sensor can be built into the surface 22 to detect the position of an emitter or transmitter in mouse 12 and thus detect the position of the mouse 12 on the surface 22.

An actuator 18 is coupled to the housing 50 to provide haptic feedback to the user. In the described embodiment, actuator 18 is a linear electromagnetic actuator having a stationary portion 66 coupled to the mouse housing 50 (and thus stationary only with respect to the portion of the mouse housing to which it is coupled), and a moving portion 67 that moves linearly approximately along the Z-axis. In the described embodiment, the stationary portion 66 includes a magnet and the moving portion 67 includes a wire coil. An inertial mass 64 is coupled to the linearly-moving portion of the actuator. The actuator 18 is operative to oscillate the inertial mass 64 quickly along the axis C which is approximately parallel to the Z axis. Thus, forces produced by the moving mass 64 are transmitted to the housing through the stationary portion 66 of the actuator 18 and felt by the user. These forces are substantially directed along the Z axis and therefore do not substantially interfere with motion of the mouse along the X and Y axes.

Actuator 18 can be a linear voice coil actuator as described in copending patent application Ser. No. 09/253,132, which is incorporated herein by reference, and described below in FIG. 3a. In other embodiments, the stationary portion can be the coil and the moving portion can be the magnet. Actuator 18 can be other types of actuators in other embodiments; some different types of actuators that can be used in the present invention are described with reference to FIGS. 3a–3c. The actuator 18 can be placed in a variety of positions within the mouse housing. For example, one preferred embodiment places the actuator on the bottom portion of the housing, as close to the center of the mouse along both the X and Y axes as possible to prevent a wobble effect on the mouse when the actuator is active. In other embodiments, the actuator 18 can be positioned centered along one axis but off-center along the other axis to accommodate other electronic and mechanical components in the mouse, e.g. near the front or back of the mouse. In yet other embodiments, the actuator 18 can be connected to a side or top portion of the housing 50 rather than the bottom portion 68, although it is preferred that the actuator be oriented to output forces approximately along the Z-axis (and thus the top may be preferable to the side). A variety of tactile sensations can be output to the user, many of which are described in greater detail below with respect to FIG. 5.

An additional challenge of applying a compelling tactile sensation to the mouse housing along the described Z axis is that the mouse sits upon a table or other surface 22 and is therefore physically grounded along that Z axis. In other words, the forces applied by the actuator 18 along the Z axis, with respect to the inertial mass, are countered by the normal forces applied by the table surface upon the mouse housing. One way to accommodate these countering forces is to use a flexible or semi-flexible surface under the mouse such as a standard mouse pad. This type of flexible surface increases the transmissibility of the inertial forces from the actuator to the housing. Alternate embodiments include coupling the stationary portion 66 of the actuator 18 to a portion of the housing 50 that is different from the base or bottom portion 68 of the housing (e.g. the side of the housing), and providing an amount of flex between the actuator-coupled portion of the mouse housing and the base portion 68 that is in contact with the surface 22. For example, flexible hinges or connecting members can couple the two portions. This too improves the transmissibility of the tactile sensations, and can also be used in conjunction with a mouse pad for still better force transmissibility.

Buttons 16 can be selected by the user as a "command gesture" when the user wishes to input a command signal to the host computer 14. The user pushes a button 16 down (in the degree of freedom of the button approximately along axis z) to provide a command to the computer. The command signal, when received by the host computer, can manipulate the graphical environment in a variety of ways. In one embodiment, an electrical lead can be made to contact a sensing lead as with any mechanical switch to determine a simple on or off state of the button. An optical switch or other type of digital sensor can alternatively be provided to detect a button press. In a different continuous-range button embodiment, a sensor can be used to detect the precise position of the button 16 in its range of motion (degree of freedom). In some embodiments, one or more of the buttons 16 can be provided with force feedback (in addition to the inertial tactile feedback from actuator 18), as described in copending patent application Ser. No. 09/235,132.

Figure 3A:
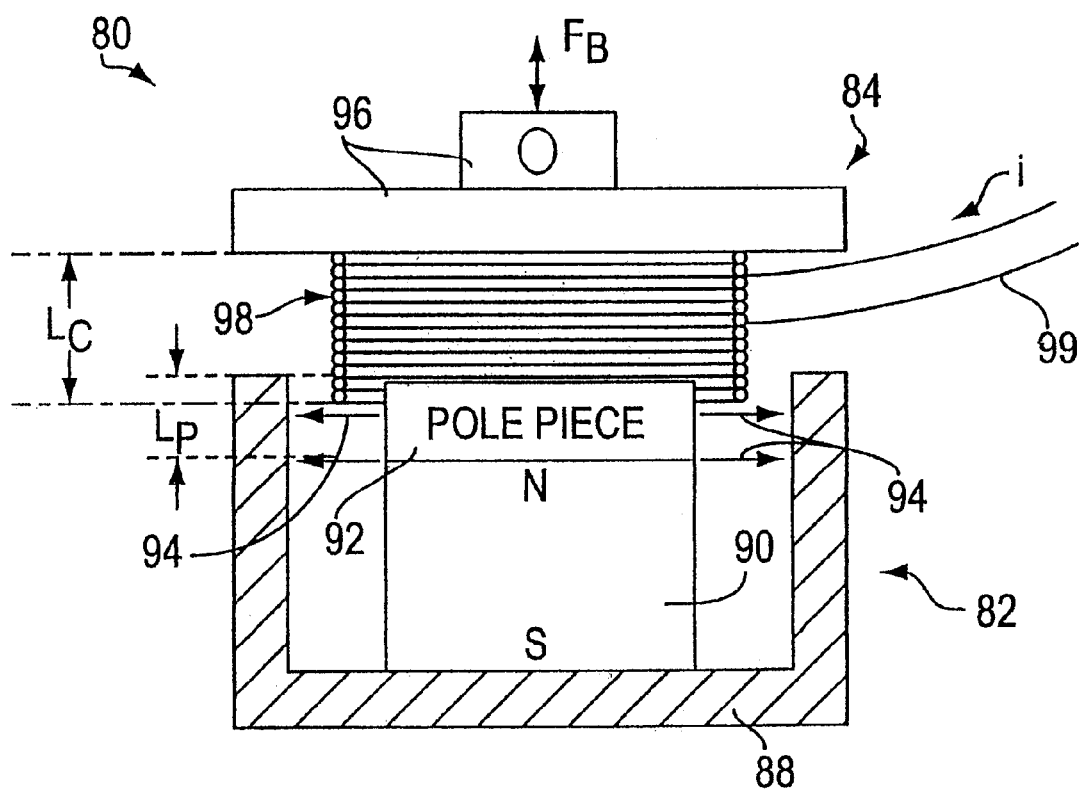
FIGS. 3a–3c are views of different types of actuators suitable for use with the present invention.

FIG. 3a is a schematic view of a one embodiment 80 of actuator 18 suitable for use with the present invention. Actuator 80 is a low cost, low power component and has a high bandwidth and a small range of motion and is thus well suited for use with the present invention. Actuator 80 is a voice coil actuator that includes a magnet portion 82 (which is the stationary portion 66) and a bobbin 84 (which is the moving portion 67). The magnet portion 82 is grounded and the bobbin 84 is moved relative to the magnet portion. In other embodiments, the bobbin 84 can be grounded and the magnet portion 82 can be moved. Magnet portion 82 includes a housing 88 made of a metal such as steel. A magnet 90 is provided within the housing 88 and a pole piece 92 is positioned on magnet 90. Magnet 90 provides a magnetic field 94 that uses steel housing 88 as a flux return path. Pole piece 92 focuses the flux into the gap between pole piece 92 and housing 88. The length of the pole piece 92 is designated as $L_P$ as shown. The housing 88, magnet portion 82, and bobbin 84 are preferably cylindrically shaped, but can also be provided as other shapes in other embodiments.

Bobbin 84 is operative to move linearly with respect to magnet portion 88. Bobbin 84 includes a support member 96 and a coil 98 attached to the support member 96. The coil is preferably wound about the support member 96 in successive loops. The length of the coil is designated as $L_C$ in FIG. 3. When the bobbin is moved, the coil 98 is moved through the magnetic field 94. An electric current I is flowed through the coil 98 via electrical connections 99. As is well known to those skilled in the art, the electric current in the coil generates a magnetic field. The magnetic field from the coil then interacts with the magnetic field 94 generated by magnet 90 to produce a force. The magnitude or strength of the force is dependent on the magnitude of the current that is applied to the coil and the strength of the magnetic field. Likewise, the direction of the force depends on the direction of the current in the coil. The inertial mass 64 is preferably coupled to the bobbin 84 and moves linearly with the bobbin. The operation and implementation of force using magnetic fields is well known to those skilled in the art. One example of voice coil actuators is provided in U.S. Pat. No. 5,805,140, which is incorporated herein by reference.

The length of coil $L_C$ and length of pole piece $L_P$ can be adjusted to suit a particular application. For example, to provide a long stroke of bobbin 84 and an approximately constant force to be output over the linear range of motion of the bobbin, the length of coil $L_C$ is greater than the length of the pole piece $L_P$, such as two to three times greater. However, in most embodiments, only a short stroke of bobbin 84 is required, and the coil length $L_C$ can be made close to or the same as the length of the pole piece $L_P$.

Figure 3B:
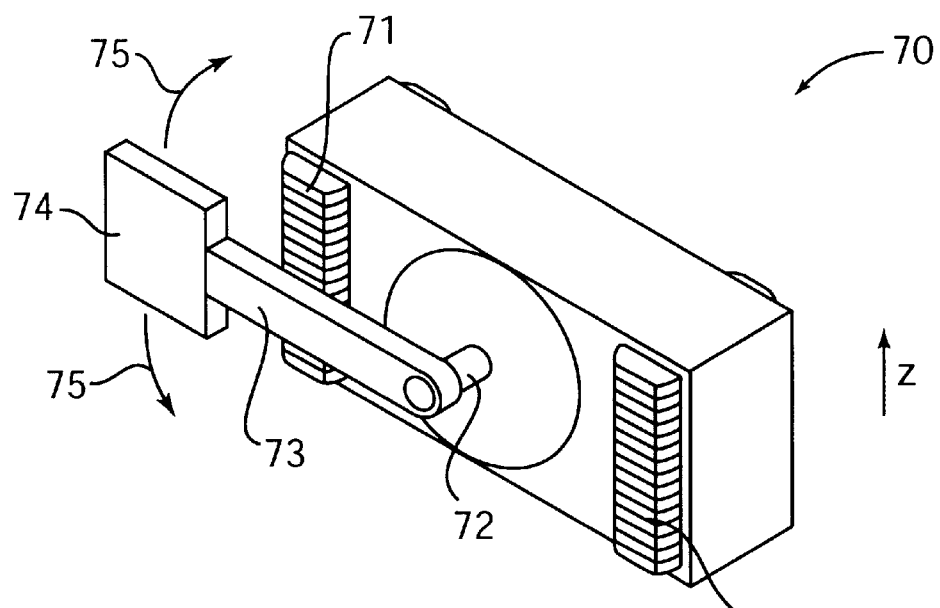

FIG. 3b is a perspective view of a different actuator 70. Actuator 70 has a spinning shaft 72 which can be rotated a fraction of one revolution. An arm 73 is coupled to the shaft 72 approximately perpendicularly to the axis of rotation of the shaft. An inertial mass 74 is coupled to the other end of the arm 73. When the shaft 72 is oscillated, pulses or a vibration is imparted to the housing of the mouse from the inertia. The oscillation of the mass 74 along directions 75 is approximately along the Z-axis and therefore the forces are not in the X-Y plane of motion of the mouse. The actuator 70 shown is an E-core moving magnet actuator, described in greater detail in copending provisional application Ser. No. 60/133,208, which is incorporated herein by reference; the actuator can include two stationary coils 71, as shown, for greater magnitude tactile sensations, or the actuator can include only one coil if space is to be conserved. In other moving magnet embodiments, the magnet can be moved linearly rather than rotationally.

Figure 3C:
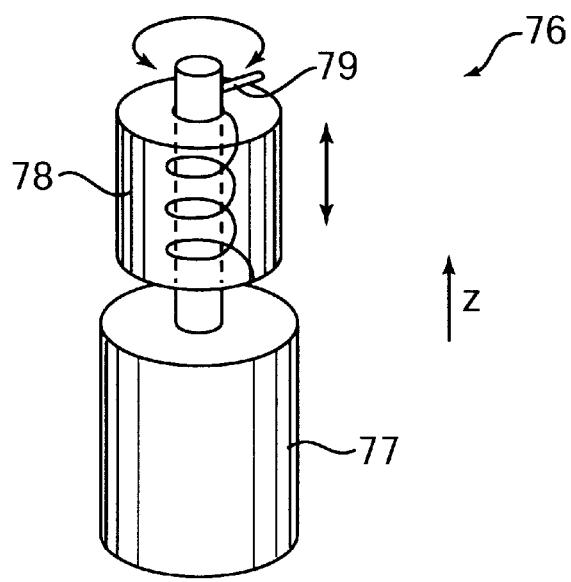

FIG. 3c is a perspective view of another type of actuator 76 that can be used for actuator 18 in the present invention. A pager motor 77 or other actuator having a rotating shaft is shown. An actuator plug 78 has a high-pitch internal thread which mates with a pin 79 extending from the side of the rotating shaft of the motor, thus providing a low cost lead screw. When the shaft is rotating, the pin causes the plug 78 to move up or down along the Z-axis; when the shaft is oscillated, the plug 78 acts as an inertial mass (or can be coupled to the inertial mass 64) and an appropriate tactile sensation is provided to the mouse.

In other embodiments, different types of actuators can be used. For example, a solenoid having a vertically-moving portion can be used for the linear actuator. A linear voice magnet, DC current controlled linear motor, a linear stepper motor controlled with pulse width modulation of an applied voltage, a pneumatic/hydraulic actuator, a torquer (motor with limited angular range), a piezo-electric actuator, etc., can be used. A rotary actuator can be used to output a torque in a rotary degree of freedom on a shaft, which is converted to linear force and motion through a transmission, as is well known to those skilled in the art.

Figure 4:
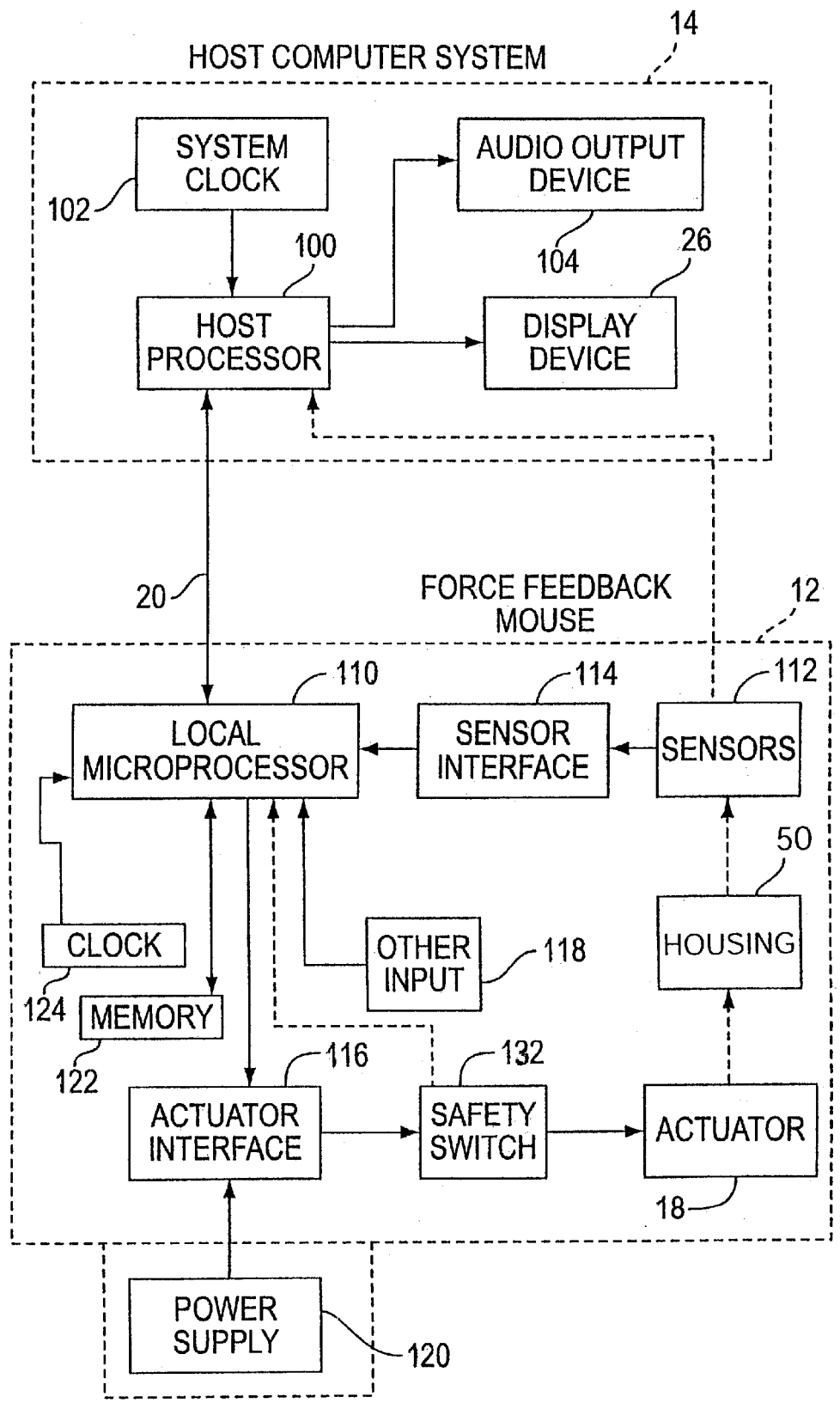
FIG. 4 is a block diagram of the mouse and host computer of the present invention.

FIG. 4 is a block diagram illustrating one embodiment of the force feedback system of the present invention including a local microprocessor and a host computer system.

Host computer system 14 preferably includes a host microprocessor 100, a clock 102, a display screen 26, and an audio output device 104. The host computer also includes other well known components, such as random access memory (RAM), read-only memory (ROM), and input/output (I/O) electronics (not shown). Display screen 26 displays images of a game environment, operating system application, simulation, etc. Audio output device 104, such as speakers, is preferably coupled to host microprocessor 100 via amplifiers, filters, and other circuitry well known to those skilled in the art and provides sound output to user when an "audio event" occurs during the implementation of the host application program. Other types of peripherals can also be coupled to host processor 100, such as storage devices (hard disk drive, CD ROM drive, floppy disk drive, etc.), printers, and other input and output devices.

Mouse 12 is coupled to host computer system 14 by a bidirectional bus 20 The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to actuator 18.

Mouse 12 can include a local microprocessor 110. Local microprocessor 110 can optionally be included within the housing of mouse 12 to allow efficient communication with other components of the mouse. Processor 110 is considered local to mouse 12, where "local" herein refers to processor 110 being a separate microprocessor from any processors in host computer system 14. "Local" also preferably refers to processor 110 being dedicated to haptic feedback and sensor I/O of mouse 12. Microprocessor 110 can be provided with software instructions to wait for commands or requests from computer host 14, decode the command or request, and handle/control input and output signals according to the command or request. In addition, processor 110 can operate independently of host computer 14 by reading sensor signals and calculating appropriate forces from those sensor signals, time signals, and stored or relayed instructions selected in accordance with a host command. Suitable microprocessors for use as local microprocessor 110 include the MC68HC711E9 by Motorola, the PIC16C74 by Microchip, and the 82930AX by Intel Corp., for example, as well as more sophisticated force feedback processors such as the Immersion Touchsense Processor. Microprocessor 110 can include one microprocessor chip, multiple processors and/or co-processor chips, and/or digital signal processor (DSP) capability.

Microprocessor 110 can receive signals from sensor 112 and provide signals to actuator 18 in accordance with instructions provided by host computer 14 over bus 20. For example, in a local control embodiment, host computer 14 provides high level supervisory commands to microprocessor 110 over bus 20, and microprocessor 110 decodes the commands and manages low level force control loops to sensors and the actuator in accordance with the high level commands and independently of the host computer 14. This operation is described in greater detail in U.S. Pat. Nos. 5,739,811 and 5,734,373, both incorporated by reference herein. In the host control loop, force commands are output from the host computer to microprocessor 110 and instruct the microprocessor to output a force or force sensation having specified characteristics. The local microprocessor 110 reports data to the host computer, such as locative data that describes the position of the mouse in one or more provided degrees of freedom. The data can also describe the states of buttons 16 and safety switch 132. The host computer uses the data to update executed programs. In the local control loop, actuator signals are provided from the microprocessor 110 to actuator 18 and sensor signals are provided from the sensor 112 and other input devices 118 to the microprocessor 110. Herein, the term "tactile sensation" refers to either a single force or a sequence of forces output by the actuator 18 which provide a sensation to the user. For example, vibrations, a single jolt, or a texture sensation are all considered tactile sensations. The microprocessor 110 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other hardware can be provided locally to mouse 12 to provide functionality similar to microprocessor 110. For example, a hardware state machine incorporating fixed logic can be used to provide signals to the actuator 18 and receive sensor signals from sensors 112, and to output tactile signals according to a predefined sequence, algorithm, or process. Techniques for implementing logic with desired functions in hardware are well known to those skilled in the art. Such hardware can be better suited to less complex force feedback devices, such as the device of the present invention.

In a different, host-controlled embodiment, host computer 14 can provide low-level force commands over bus 20, which are directly transmitted to the actuator 18 via microprocessor 110 or other circuitry. Host computer 14 thus directly controls and processes all signals to and from the mouse 12, e.g. the host computer directly controls the forces output by actuator 18 and directly receives sensor signals from sensor 112 and input devices 118. This embodiment may be desirable to reduce the cost of the force feedback device yet further, since no complex local microprocessor 110 or other processing circuitry need be included in the mouse. Furthermore, since one actuator 18 is used with forces not provided in the primary sensed degrees of freedom, the local control of forces by microprocessor 110 may not be necessary in the present invention to provide the desired quality of forces.

In the simplest host control embodiment, the signal from the host to the device can be a single bit that indicates whether to pulse the actuator at a predefined frequency and magnitude. In a more complex embodiment, the signal from the host could include a magnitude, giving the strength of the desired pulse. In yet a more complex embodiment, the signal can include a direction, giving both a magnitude and a sense for the pulse. In still a more complex embodiment, a local processor can be used to receive a simple command from the host that indicates a desired force value to apply over time. The microprocessor then outputs the force value for the specified time period based on the one command, thereby reducing the communication load that must pass between host and device. In an even more complex embodiment, a high-level command with tactile sensation parameters can be passed to the local processor on the device which can then apply the full sensation independent of host intervention. Such an embodiment allows for the greatest reduction of communication load. Finally, a combination of numerous methods described above can be used for a single mouse device 12.

Local memory 122, such as RAM and/or ROM, is preferably coupled to microprocessor 110 in mouse 12 to store instructions for microprocessor 110 and store temporary and other data. For example, force profiles can be stored in memory 122, such as a sequence of stored force values that can be output by the microprocessor, or a look-up table of force values to be output based on the current position of the user object. In addition, a local clock 124 can be coupled to the microprocessor 110 to provide timing data, similar to system clock 18 of host computer 12; the timing data might be required, for example, to compute forces output by actuator 18 (e.g., forces dependent on calculated velocities or other time dependent factors). In embodiments using the USB communication interface, timing data for microprocessor 110 can be alternatively retrieved from the USB signal.

For example, host computer 14 can send a "spatial representation" to the local microprocessor 110, which is data describing the locations of some or all the graphical objects displayed in a GUI or other graphical environment which are associated with forces and the types/characteristics of these graphical objects. The microprocessor can store such a spatial representation in local memory 122, and thus will be able to determine interactions between the user object and graphical objects (such as the rigid surface) independently of the host computer. In addition, the microprocessor can be provided with the necessary instructions or data to check sensor readings, determine cursor and target positions, and determine output forces independently of host computer 18. The host could implement program functions (such as displaying images) when appropriate, and synchronization commands can be communicated between the microprocessor and host 18 to correlate the microprocessor and host processes. Also, the local memory can store predetermined force sensations for the microprocessor that are to be associated with particular types of graphical objects. Alternatively, the computer 14 can directly send force feedback signals to the mouse 12 to generate tactile sensations.

Sensors 112 sense the position or motion of the mouse (e.g. the housing 50) in its planar degrees of freedom and provides signals to microprocessor 110 (or host 14) including information representative of the position or motion. Sensors suitable for detecting planar motion of a mouse include digital optical encoders frictionally coupled to a rotating ball or cylinder, as is well known to those skilled in the art. Optical sensor systems, linear optical encoders, potentiometers, optical sensors, velocity sensors, acceleration sensors, strain gauge, or other types of sensors can also be used, and either relative or absolute sensors can be provided. Optional sensor interface 114 can be used to convert sensor signals to signals that can be interpreted by the microprocessor 110 and/or host computer system 14, as is well known to those skilled in the art.

Actuator 18 transmits forces to the housing 50 of the mouse as described above with reference to FIG. 2 in response to signals received from microprocessor 110 and/or host computer 14. Actuator 18 is provided to generate inertial forces by moving an inertial mass; in the preferred embodiment, the mass is moved linearly and approximately perpendicular to the planar degrees of freedom of motion of the mouse and thus the actuator 18 does not generate force in the primary degrees of freedom of motion of the mouse. Actuator 18 instead provides "informative" or "effect" forces that do not resist or assist motion. The sensors 112 detect the position/motion of the mouse 12 in its planar degrees of freedom, and this sensing is not substantially affected by the output of forces by actuator 18.

The actuator described herein has the ability to apply short duration force sensation on the handle of the mouse with respect to the inertial mass. This short duration force sensation is described herein as a "pulse." Ideally the "pulse" is directed substantially along a Z axis orthogonal to the X-Y plane of motion of the mouse. In progressively more advanced embodiments, the magnitude of the "pulse" can be controlled; the sense of the "pulse" can be controlled, either positive or negative biased; a "periodic force sensation" can be applied on the handle of the mouse with respect to the inertial mass, where the periodic sensation can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time; and the resulting force signal can be "impulse wave shaped" as described in U.S. Pat. No. 5,959,613. There are two ways the period sensations can be communicated from the host to the device. The wave forms can be "streamed" as described in U.S. Pat. No. 5,959,613 and pending provisional patent application 60/160,401, both incorporated herein by reference. Or the waveforms can be conveyed through high level commands that include parameters such as magnitude, frequency, and duration, as described in U.S. Pat. No. 5,734,373.

Alternate embodiments can employ additional actuators for providing tactile sensations or forces in the planar degrees of freedom of the mouse 12. For example, the mouse can be enhanced with a secondary actuator; because of power constraints, this secondary means can be passive (i.e., it dissipates energy). The passive actuator can be a brake, such as a brake employing a very low power substrate such as a magneto-rheological fluid. Alternatively it could be a more traditional magnetic brake. The passive braking means can be employed through a frictional coupling between the mouse housing and the table surface 22. For example, a friction roller in the mouse housing base can engage the table surface. The roller can spin freely when the mouse is moved by the user so long as the passive is not engaged. When the brake is engaged, the user can feel the passive resistance to motion of the mouse (in one or two degrees of freedom). The passive resistance can allow additional feel sensations that supplement the "pulse" and "vibration" sensations described above (described with reference to FIG. 5.) A different embodiment is described in co-pending application Ser. No. 08/965,720, filed Nov. 7, 1997, and incorporated herein by reference.

Actuator interface 116 can be optionally connected between actuator 18 and microprocessor 110 to convert signals from microprocessor 110 into signals appropriate to drive actuator 18. Interface 38 can include power amplifiers, switches, digital to analog controllers (DACs), analog to digital controllers (ADCs), and other components, as is well known to those skilled in the art.

Other input devices 118 are included in mouse 12 and send input signals to microprocessor 110 or to host 14 when manipulated by the user. Such input devices include buttons 16 and can include additional buttons, dials, switches, scroll wheels, or other controls or mechanisms.

Power supply 120 can optionally be included in mouse 12 coupled to actuator interface 116 and/or actuator 18 to provide electrical power to the actuator. or be provided as a separate component. Alternatively, and more preferably, power can be drawn from a power supply separate from mouse 12, or power can be received across a USB or other bus. Also, received power can be stored and regulated by mouse 12 and thus used when needed to drive actuator 18 or used in a supplementary fashion. Because of the limited power supply capabilities of USB, a power storage device may be required in the mouse device to ensure that peak forces can be applied (as described in U.S. Pat. No. 5,929,607, incorporated herein by reference). For example, power can be stored over time in a capacitor or battery and then immediately dissipated to provide a jolt sensation to the mouse. Alternatively, this technology can be employed in a wireless mouse, in which case battery power is used to drive the tactile actuator. In one embodiment, the battery can be charged by an electric generator on board the mouse, the generator driven by the user's motions of the mouse device. For example, a mouse ball or cylinder can turn a frictional roller or shaft that is coupled to and recharges the generator.

A safety switch 132 can optionally be included to allow a user to deactivate actuator 18 for safety reasons. For example, the user must continually activate or close safety switch 132 during operation of mouse 12 to enable the actuator 18. If, at any time, the safety switch is deactivated (opened), power from power supply 120 is cut to actuator 18

(or the actuator is otherwise disabled) as long as the safety switch is opened. Embodiments include an optical switch, an electrostatic contact switch, a button or trigger, a hand weight safety switch, etc.

Figure 5:
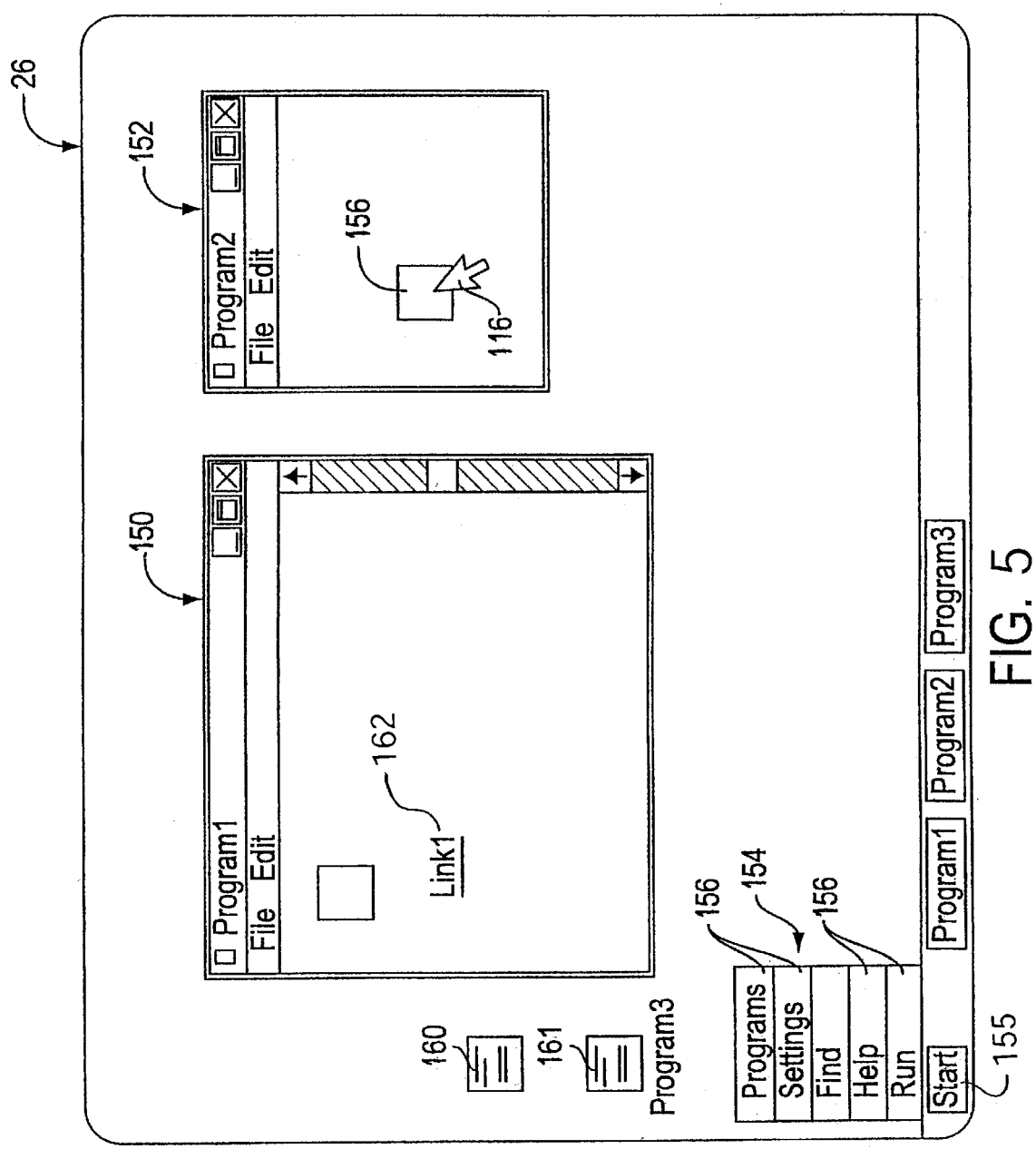
FIG. 5 is a diagrammatic view of a display screen showing graphical object associated with force sensations output using the mouse of the present invention.

FIG. 5 is a diagram of display screen 26 of host computer 14 showing a graphical user interface for use with the present invention, which is one type of graphical environment with which the user can interact using the device of the present invention. The haptic feedback mouse of the present invention can provide tactile sensations that make interaction with graphical objects more compelling and more intuitive. The user typically controls a cursor 146 to select and manipulate graphical objects and information in the graphical user interface. The cursor is moved according to a position control paradigm, where the position of the cursor corresponds to a position of the mouse in its planar workspace. Windows 150 and 152 display information from application programs running on the host computer 14. Menu elements 156 of a menu 154 can be selected by the user after a menu heading or button such as start button 155 is selected. Icons 156, 160, and 161 and web links 162 are displayed features that can also be selected. Tactile sensations associated with these graphical objects can be output using actuator 18 based on signals output from the local microprocessor or host computer.

A basic tactile functionality desired for the mouse device described herein is a "pulse" (or jolt) sensation that is output when the cursor is (a) moved between menu elements 156 of a menu 154, (b) moved on to an icon 156, button, hyperlink 162, or other graphical target, (c) moved across a boundary of a window 150 or 152, (d) moved over application-specific elements in a software title such as nodes in a flow chart, the points of a drawing, or the cells of a spread sheet. The appropriate sensation for this simple cursor interaction is a quick, abrupt "pulse" or "pop." This can be achieved by applying a crisp, short force between the inertial mass and the housing of the mouse device, e.g. by moving the inertial mass in one or a small number of oscillations. For example, a pulse can include a single impulse of force that quickly rises to a desired magnitude and then is turned off or quickly decays back to zero or small magnitude.

A vibration can also be output, which can include a series of pulses applied periodically over a particular time period at a particular frequency. The time-varying force can be output according to a force vs. time waveform that is shaped like a sine wave, triangle wave, sawtooth wave, or other shape of wave. The vibration is caused by the mass 64 oscillating back and forth.

In some embodiments, the sensation of a "spatial texture" may be output by correlating pulses and/or vibrations with the motion of the cursor over a graphical object or area. This type of force can depend on the position of the mouse in its planar workspace (or on the position of the cursor in the graphical user interface). For example, the cursor can be dragged over a graphical grating and pulses can be correlated with the spacing of the grating. Thus, texture bumps are output depending on whether the cursor has moved over the location of a bump in a graphical object; when the mouse is positioned between "bumps" of the texture, no force is output, and when the mouse moves over a bump, a force is output. This can be achieved by host control (e.g., the host sends the pulses as the cursor is dragged over the grating) or by local control (e.g., the host sends a high level command with texture parameters and the sensation is directly controlled by the device). In other cases a texture can be performed by presenting a vibration to a user, the vibration being dependent upon the current velocity of the mouse in its planar workspace. When the mouse is stationary, the vibration is deactivated; as the mouse moves faster, the frequency and magnitude of the vibration is increased. This sensation could be controlled locally by the device processor, or be controlled by the host. Local control by the device may eliminate communication burden in some embodiments. Other spatial force sensations can also be output. In addition, any of the described force sensations herein can be output by actuator 18 simultaneously or otherwise combined as desired.

The host computer 14 can coordinate tactile sensations with interactions or events occurring within the host application. The individual menu elements 156 in the menu can be associated with forces. In one interaction, when the cursor is moved across menu elements 156 in menu 154 of the graphical user interface, "pulse" sensations are applied. The sensations for certain menu choices can be stronger than others to indicate importance or frequency of use, i.e., the most used menu choices can be associated with higher-magnitude (stronger) pulses than the less used menu choices. Also, disabled menu choices can have a weaker pulse, or no pulse, to indicate that the menu choice is not enabled at that time. Furthermore, when providing tiled menus in which a sub-menu is displayed after a particular menu element is selected, as in Microsoft Windows™, pulse sensations can be sent when a sub-menu is displayed. This can be very useful because users may not expect a sub-menu to be displayed when moving a cursor on a menu element.

Pulse sensations can also be output based on interaction between cursor 146 and a window. For example, a pulse can be output when the cursor is moved over a border of a window 150 or 152 to signal the user of the location of the cursor. When the cursor 146 is moved within the window's borders, a texture force sensation can be output. The texture can be a series of bumps that are spatially arranged within the area of the window in a predefined pattern; when the cursor moves over a designated bump area, a pulse sensation is output when the cursor moves over designated pulse points or lines. A pulse can also be output when the cursor is moved over a selectable object, such as a link 154 in a displayed web page or an icon 156. A vibration can also be output to signify a graphical object which the cursor is currently positioned over. Furthermore, features of a document displaying in window 150 or 152 can also be associated with force sensations.

In another interaction, when the cursor is moved over an icon 156, folder, hyperlink 162, or other graphical target, a pulse sensation is applied. The sensation associated with some elements can be stronger than others to indicate importance or just to differentiate different elements. For example, icons can be associated with stronger pulses than folders, where the folders can be associated with stronger pulses than tool bar items. Also, the strength of a pulse can be associated with the displayed size of the graphical element, where a large tool bar icon can be associated a stronger pulse than a small tool bar icon. On web pages this is particularly interesting, where small graphical targets can be associated with weaker pulses than large graphical targets. Also, on web pages check boxes and hyperlinks can feel different than buttons or graphical elements based on pulse strength. The magnitude of the pulses can also depend on other characteristics of graphical objects, such as an active window as distinguished from a background window, file folder icons of different priorities designated by the user, icons for games as distinguished from icons for business applications, different menu items in a drop-down menu, etc. Methods of adding tactile sensations to web pages is described in U.S. Pat. No. 5,956,484 and co-pending patent application Ser. No. 08/571,606, both incorporated herein by reference.

In another interaction, when a document is being scrolled, a pulse sensation can be used to indicate the passing of page breaks or other demarcations, e.g. when a particular area or feature of a scrolled page is scrolled past a particular area of the window. In a related tactile sensations, when a document is being scrolled, a vibration sensation can be used to indicate the motion. The frequency of the vibration can be used to indicate the speed of the scrolling, where fast scrolling is correlated with higher-frequency sensations than slow scrolling.

In other related scrolling interactions, when a down-arrow is pressed on a scroll bar, a vibration can be displayed on the device to indicate that scrolling is in process. When using a graphical slider and reaching the end of the slider's travel, a pulse can be used to indicate that the end of travel has been reached. When using a slider bar that has "tick marks", pulse sensations can be used to indicate the location of the "ticks." In some slider bars there is only a single tick mark to indicate the center of the slider bar; a pulse can be output to inform the user when center is reached. In other slider bars there are ticks of different size (for example the center tick may be more important than the others). In such an embodiment, different strength pulses can be used, larger strength indicating the more important ticks. For example, when setting the balance on system audio speakers, a slider is used with tick marks. The user can feel the ticks with the present invention by providing associated pulses, especially the center tick which indicates center balance. Pulses can also be provided for volume controls. In other instances, strength of a vibration can be correlated with the adjustment of a volume control to indicate magnitude. In yet other instances the frequency of a vibration can be correlated with the adjustment of a volume control to indicate magnitude.

In other interactions, when dragging a graphical object in a graphical user interface, such as an icon, or stretching an element such as a line, a vibration sensation can be used to indicate that the function is active.

In some cases a user performs a function, like cutting or pasting a document, and there is a delay between the button press that commands the function and the execution of the function, due to processing delays or other delays. A pulse sensation can be used to indicate that the function (the cut or paste) has been executed.

Tactile sensations can also be associated with particular events that the user may or may not have control over. For example, when email arrives or an appointment reminder is displayed, a pulse or a vibration can be output to notify the user of the event. This is particularly useful for disabled users (e.g., blind or deaf users). When an error message or other system event is displayed in a dialog box on the host computer, a pulse or vibration can be used to draw the user's attention to that system event. When the host system is "thinking," requiring the user to wait while a function is being performed or accessed (usually when a timer is displayed by the host) it is often a surprise when the function is complete. If the user takes his or her eyes off the screen, he or she may not be aware that the function is complete. A pulse sensation can be sent to indicate that the "thinking" is over. The tactile sensations can be varied to signify different types of events or different events of the same type. For example, vibrations of different frequency can each be used to differentiate different events or different characteristics of events, such as particular users sending email, the priority of an event, or the initiation or conclusion of particular tasks (e.g. the downloading of a document or data over a network).

Many tactile sensations can be coordinated with interactions and events occurring within specific types of applications. For example, in a gaming application, a wide variety of periodic sensations can be used to enhance various gaming actions and events, such as engine vibrations, weapon fire, crashes and bumps, rough roads, explosions, etc. These sensations can be implemented as button reflexes as described in U.S. Pat. No. 5,691,898, incorporated herein by reference.

In a spread sheet application, pulse sensations can be used to indicate when the cursor is moved from one element or cell to another. Stronger pulses can be used to indicate when a particular or predefined row, column, or cell is encountered. Ideally the user who is crafting the spreadsheet can define the strength of the sensation as part of the spreadsheet construction process as well as the particular features assigned to particular pulse strengths.

In a word processor, pulse sensations can be output to allow the user to feel the boundaries between words, the spaces between words, the spaces between lines, punctuation, highlights, bold text, or other notable elements. When adjusting the tab spacing in a word processor, pulses can be used to indicate the adjustment of the graphical tab markers. Stronger pulses can be used on the spaces at certain multiples. When writing an outline in a word processor in which a hierarchy of paragraphs is imposed, pulses can be used to indicate when the cursor is on a particular outline line of a given hierarchy.

In a drawing application that allows a user to lay down color pixels using a "spray can" metaphor, a vibration can be output during the "spraying" process to make the spray-can metaphor more compelling to the user. Drawing or CAD programs also have many other features which can be associated with pulses or other sensations, such as displayed (or invisible) grid lines or dots, control points of a drawn object, outlines or borders of objects, etc.

On web pages, pulse or vibration content can be used to enhance the user experience, e.g. for web objects such as web page links, entry text boxes, graphical buttons, and images. Methods of adding such content are described in U.S. Pat. No. 5,956,484 and co-pending patent application Ser. No. 08/571,606, both incorporated herein by reference.

There may be certain cases where a user might want to be able to turn on or turn off the pulse feedback for a particular feature. For example, when adding a letter to a word in a word processor it is useful to be able to feel the letters as pulses as the cursor is moved from letter to letter along a word. However, this sensation is not always desired by the user. Therefore the sensation can preferably be enabled or disabled by a software selector such as a check box, and/or by hardware such as pressing a button on the mouse. In other cases or embodiments, a feature can be enabled or disabled depending upon the velocity at which the mouse is being moved. For example, if the user is moving the cursor very quickly across the displayed desktop, the user is probably not trying to select a graphical object in the path of the cursor. In that case the pulses could be a distraction as the cursor passes over icons or over window borders. Therefore, it would be advantageous if the host software (or the software/firmware run by a local microprocessor) attenuated or eliminated the pulses when moving at or greater than a threshold velocity. Conversely, when the user is moving the cursor slowly he or she is likely trying to select or engage a graphical target; in that case the pulses could be active or even accentuated with a higher magnitude.

A software designer may want to allow a user to access a software function by positioning the cursor over an area on the screen, but not require pressing a button on the mouse (as is the typical way to execute a function, often called "clicking"). Currently, it is problematic to allow "click-less" execution because a user has physical confirmation of execution when pressing a button. A pulse sent to the tactile mouse of the present invention can act as that physical confirmation without the user having to press a button. For example, a user can position a cursor over a web page element, and once the cursor is within the desired region for a given period of time, an associated function can be executed. This is indicated to the user through a tactile pulse sent to the mouse.

If a second actuator is being used to supplement the primary actuator 18, such as a low-power brake as described with respect to FIG. 4, then the passive resistance provided by the brake can allow additional feel sensations that supplement the "pulse" and "vibration" sensations described above. For example, when a user drags an icon, the passive resistance force can provide a dragging (damping) sensation to the user. The larger the object to be dragged (in displayed size or other measurable characteristic), the more resistance is applied. Also, when a user stretches an image, the passive resistance force can provide a dragging sensation. The larger the object to be dragged, the more resistance is applied. The use of both active and passive haptic feedback can be used synergistically; for example, passive resistance can be useful to slow down mouse movement when selecting menu items, but since passive feedback can only be output when the mouse is being moved by the user, active feedback is useful to be output when the mouse is at rest or moving slowly. An embodiment employing passive braking can also employ the "desired play" methodology described in U.S. Pat. No. 5,767,839, incorporated herein by reference, to achieve enhanced functionality.

While this invention has been described in terms of several preferred embodiments, it is contemplated that alterations, permutations and equivalents thereof will become apparent to those skilled in the art upon a reading of the specification and study of the drawings. For example, many different types of tactile sensations can be provided with the actuator of the present invention and many different types of actuators can be used. Furthermore, certain terminology has been used for the purposes of descriptive clarity, and not to limit the present invention. It is therefore intended that the following appended claims include alterations, permutations, and equivalents as fall within the true spit and scope of the present invention.

What is claimed is:

1. A tactile feedback mouse coupled to a host computer implementing a host application program, said mouse physically manipulated by a user in a planar workspace, the mouse comprising:

a housing that is physically contacted and moved by said user;

a sensor device coupled to said housing of said mouse, said sensor device detecting said movement of said mouse in said planar workspace and outputting sensor signals representative of said movement; and an actuator coupled to said housing of said mouse, said actuator operative to output an inertial force with respect to an inertial ground, said inertial force output approximately along an axis perpendicular to said planar workspace, wherein said inertial force is generated by oscillating an inertial mass approximately along said axis with respect to said housing, said inertial force transmitted through said housing to said user contacting said housing.

2. A tactile feedback mouse as recited in claim 1 wherein said actuator is a linear actuator having a moving portion that moves linearly with respect to a non-moving portion of said actuator, wherein said linear actuator moves said inertial mass bi-directionally along a linear axis that is substantially perpendicular to said planar workspace.

3. A tactile feedback mouse as recited in claim 2 wherein said linear actuator is a voice coil actuator.

4. A tactile feedback mouse as recited in claim 1 wherein said actuator is a rotary actuator that rotates a shaft.

5. A tactile feedback mouse as recited in claim 4 wherein said rotary actuator moves said inertial mass approximately linearly by rotating said inertial mass bidirectionally a small fraction of a full revolution of said shaft.

6. A tactile feedback mouse as recited in claim 1 wherein said inertial force is correlated with a graphical representation displayed by said host computer, wherein a position of said mouse in said planar workspace corresponds with a position of a cursor displayed in said graphical representation.

7. A tactile feedback mouse as recited in claim 1 wherein said inertial force is a pulse correlated with the interaction of a user-controlled cursor with a graphical object displayed a graphical user interface by said host computer.

8. A tactile feedback mouse as recited in claim 7 wherein said pulse is output with a magnitude dependent on a characteristic of said graphical object with which said cursor interacts.

9. A tactile feedback mouse as recited in claim 8 wherein said characteristic of said graphical object is a type of said graphical object, wherein said type includes one of an icon, a window, and a menu item.

10. A tactile feedback mouse as recited in claim 8 wherein said pulse is output when said cursor moves between menu items in a displayed graphical menu.

11. A tactile feedback mouse as recited in claim 1 wherein said force is included in a force sensation, said force sensation being one of a pulse, vibration, and texture force.

12. A tactile feedback mouse as recited in claim 1 further comprising a microprocessor, separate from said host computer, coupled to said sensor and to said actuator, said microprocessor operative to receive host commands from said host computer and output force signals to said actuator for controlling said inertial force, and operative to receive said sensor signals from said sensors, process said sensor signals, and report locative data to said host computer derived from said sensor signals and indicative of said movement of said mouse.

13. A tactile feedback mouse as recited in claim 1 wherein said actuator outputs said force in response to a command received by said mouse from said host computer.

14. A tactile feedback mouse as recited in claim 1 wherein said sensor device includes a ball that frictionally contacts a surface on which said mouse is moved by said user.

15. A tactile feedback mouse as recited in claim 1 wherein said sensor device includes an optical sensor that detects motion of a surface on which said mouse is moved relative to said housing of said mouse.

16. A tactile feedback mouse as recited in claim 1 wherein said actuator is located within said housing.

17. A tactile feedback mouse as recited in claim 16 wherein a compliant member is provided between a portion of said housing contacted by said user and a ground surface over which said mouse is moved.

18. A tactile feedback mouse as recited in claim 17 wherein said compliant member includes a flexible pad resting on said ground surface, said mouse being moved on said flexible pad.

19. A tactile feedback mouse as recited in claim 17 wherein said compliant member includes a flexible connection member connecting a portion of said housing coupled to said actuator and a portion of said housing contacting said ground surface.

20. A tactile feedback mouse as recited in claim 1 wherein said inertial force is at periodic force sensation.

21. A tactile feedback mouse as recited in claim 20 wherein said periodic force sensation has a frequency.

22. A tactile feedback mouse as recited in claim 21 wherein said periodic force sensation is provided by one of a sine wave control signal and a square wave control signal.

23. A tactile feedback mouse as recited in claim 20 wherein said periodic force sensation has a magnitude that can be specified by said host computer.

24. A tactile feedback mouse as recited in claim 20 wherein a control signal causing said periodic force sensation is shaped prior to being output to said actuator, wherein said control signal is shaped to include a higher magnitude impulse followed by a lower magnitude steady state.

25. A tactile feedback mouse as recited in claim 20 wherein a sequence of force values to be output as said periodic inertial force is streamed from said host computer to said tactile feedback mouse.

26. A tactile feedback mouse as recited in claim 20 wherein a sequence of force values to be output as said periodic inertial force is streamed from said host computer to said tactile feedback mouse.

27. A tactile feedback mouse as recited in claim 1 further comprising a power storage device coupled to said actuator, said power storage device storing power and supplying said power to said actuator when appropriate to output said inertial force.

28. A haptic feedback interface device coupled to a host computer implementing a graphical environment, said interface device physically manipulated by a user, the interface device comprising:
    a moveable object that is physically contacted and moved by said user;
    a sensor device coupled to said moveable object of said interface device, said sensor device detecting said movement of said moveable object in a planar workspace and outputting sensor signals representative of said movement; and
    an actuator coupled to said moveable object of said interface device, said actuator operative to output an inertial force substantially along a particular degree of freedom with respect to an inertial ground, wherein said inertial force is generated by oscillating an inertial mass approximately linearly in said degree of freedom with respect to said housing, said inertial force transmitted through said moveable object to said user contacting said moveable object, and wherein said inertial force is correlated with an interaction of a user-controlled graphical object with a different graphical object displayed in said graphical environment.

29. A haptic feedback interface device as recited in claim 28 wherein said moveable object is a mouse and said mouse is moved in a planar workspace, and wherein said actuator is coupled to a housing of said mouse.

30. A haptic feedback interface device as recited in claim 29 wherein said actuator moves said inertial mass bi-directionally along a linear axis that is substantially perpendicular.

31. A haptic feedback interface device as recited in claim 30 wherein said linear actuator is a voice coil actuator.

32. A tactile feedback mouse as recited in claim 30 wherein said actuator is located within said housing of said mouse.

33. A tactile feedback mouse as recited in claim 32 wherein a compliant member is provided between a portion of said mouse contacted by said user and a ground surface over which said mouse is moved.

34. A tactile feedback mouse as recited in claim 33 wherein said compliant member includes a flexible pad resting on said ground surface, said mouse being moved on said flexible pad.

35. A tactile feedback mouse as recited in claim 33 wherein said compliant member includes a flexible connection member connecting a portion of said housing coupled to said actuator and a portion of said housing contacting said ground surface.

36. A tactile feedback mouse as recited in claim 30 wherein said inertial force is a periodic force sensation.

37. A tactile feedback mouse as recited in claim 36 wherein said periodic force sensation has at least one of a frequency and magnitude that can be specified by said host computer.

38. A tactile feedback mouse as recited in claim 36 wherein said periodic force sensation is provided by one of a sine wave control signal and a square wave control signal.

39. A haptic feedback interface device as recited in claim 29 wherein said user-controlled graphical object is a cursor, and wherein said inertial force is a pulse correlated with the interaction of said cursor with said different graphical object displayed in said graphical environment.

40. A haptic feedback interface device as recited in claim 39 wherein said pulse is output when said cursor moves between menu items in a displayed graphical menu.

41. A haptic feedback interface device as recited in claim 28 wherein said inertial force is included in a force sensation, said force sensation being one of a pulse, vibration, and texture force.

42. A haptic feedback interface device as recited in claim 28 further comprising a microprocessor, separate from said host computer, coupled to said sensor and to said actuator, said microprocessor operative to receive host commands from said host computer and output force signals to said actuator for controlling said inertial force, and operative to receive said sensor signals from said sensors, process said sensor signals, and report locative data to said host computer derived from said sensor signals and indicative of said movement of said moveable object.

43. A haptic feedback interface device as recited in claim 42 wherein said sensor device includes an optical sensor that detects motion of a surface on which said moveable object is moved relative to said moveable object.

44. A tactile feedback mouse as recited in claim 28 wherein said actuator is a linear actuator having a moving portion that moves linearly with respect to a non-moving portion of said actuator.

45. A tactile feedback mouse as recited in claim 28 wherein said actuator is a rotary actuator that outputs a torque, said torque moving said inertial mass for a fraction of a complete rotation to approximate a linear motion.

46. A method for providing haptic feedback to a user interacting with a graphical environment displayed by a host computer, the user manipulating a mouse device, the method comprising:
    enabling a detection of motion of said mouse device in a planar workspace and enabling a provision of an indication of said motion to said host computer;

enabling a reception of information from said host computer indicating that a tactile sensation is to be output, said tactile sensation being correlated with an interaction or event occurring within said graphical environment; and enabling an output of an inertial force with respect to an inertial ground on a housing of said mouse device along an axis substantially perpendicular to said planar workspace, said inertial force caused by oscillating an inertial mass coupled to an actuator along said axis, wherein said inertial force is transmitted through said housing and said user can contact said housing and experience said inertial force.

47. A method as recited in claim 46 wherein said actuator is a linear actuator that moves said inertial mass bidirectionally along said axis substantially perpendicular to said planar workspace to cause said inertial force along said axis.

48. A method as recited in claim 47 wherein said inertial force is correlated with an interaction between a user-controlled cursor and a graphical object displayed in said graphical environment.

49. A tactile feedback mouse coupled to a host computer implementing a graphical environment, said mouse physically manipulated by a user in a planar workspace, the mouse comprising:

a housing that is physically contacted and moved by said user;

a sensor device coupled to said housing of said mouse, said sensor device detecting said movement of said mouse in said planar workspace and outputting sensor signals representative of said movement; and an actuator coupled to said housing of said mouse, said actuator operative to apply an oscillating force on said housing along an axis substantially perpendicular to said planar workspace, said oscillating force being applied with respect to an inertial mass that acts as an inertial ground, wherein said oscillating force is transmitted through said housing to said user contacting said housing.

50. A tactile feedback mouse as recited in claim 49 wherein said actuator is a linear actuator having a moving portion that moves linearly with respect to a non-moving portion, wherein said linear actuator moves said inertial mass bi-directionally along a linear axis that is substantially perpendicular to said planar workspace.

51. A tactile feedback mouse as recited in claim 49 wherein said actuator is a rotary actuator that rotates a shaft.

52. A tactile feedback mouse as recited in claim 51 wherein said rotary actuator moves said inertial mass approximately linearly by rotating said inertial mass bi-directionally a small fraction of a full rotation of said shaft.

53. A tactile feedback mouse as recited in claim 49 wherein said inertial force is correlated with said graphical environment displayed by said host computer, wherein a position of said mouse in said planar workspace corresponds with a position of a cursor displayed in said graphical environment.

54. A tactile feedback mouse as recited in claim 49 wherein said inertial force is a pulse correlated with the interaction of a user-controlled cursor with a graphical object displayed in said graphical environment.

55. A tactile feedback mouse as recited in claim 54 said pulse is output with a magnitude dependent on a characteristic of said graphical object with which said cursor interacts.

56. A tactile feedback mouse as recited in claim 49 wherein said force is included in a force sensation, said force sensation being one of a pulse, vibration, and texture force.

57. A tactile feedback mouse as recited in claim 49 further comprising a microprocessor, separate from said host computer, coupled to said sensor and to said actuator, said microprocessor operative to receive host commands from said host computer and output force signals to said actuator for controlling said inertial force, and operative to receive said sensor signals from said sensors, process said sensor signals, and report locative data to said host computer derived from said sensor signals and indicative of said movement of said mouse.

58. A tactile feedback mouse as recited in claim 49 wherein said sensor device includes a ball that frictionally contacts a surface over which said mouse is moved by said user.

59. A tactile feedback mouse as recited in claim 49 wherein said sensor device includes an optical sensor that detects motion of a surface over which said mouse is moved relative to said housing of said mouse.

60. A tactile feedback mouse as recited in claim 49 wherein said actuator is located within said housing.

61. A tactile feedback mouse as recited in claim 60 wherein a compliant member is provided between a portion of said housing contacted by said user and a ground surface over which said mouse is moved.

62. A tactile feedback mouse as recited in claim 61 wherein said compliant member includes a flexible pad resting on said ground surface, said mouse being moved on said flexible pad.

63. A tactile feedback mouse as recited in claim 61 wherein said compliant member includes a flexible connection member connecting a portion of said housing coupled to said actuator and a portion of said housing contacting said ground surface.

64. A tactile feedback mouse as recited in claim 49 wherein said inertial force is a periodic force sensation.

65. A tactile feedback mouse as recited in claim 64 wherein said periodic force sensation is provided by one of a sine wave control signal and a square wave control signal.

66. A tactile feedback mouse as recited in claim 49 wherein said periodic force sensation has at least one of a frequency and a magnitude which can be specified by said host computer.

67. A tactile feedback mouse coupled to a host computer implementing a host application program, said mouse physically manipulated by a user in a planar workspace, the mouse comprising:

a housing that is physically contacted and moved by said user;

an optical sensor device coupled to said housing of said mouse, said optical sensor device detecting said movement of said housing in said planar workspace by detecting motion of a surface over which said housing is moved relative to said housing, said optical sensor device outputting sensor signals representative of said movement, wherein a position of said housing is determined from said sensor signals and used by said host computer; and an actuator coupled to and positioned within said housing of said mouse, said actuator operative to output an inertial force with respect to an inertial ground, said inertial force output approximately along an axis perpendicular to said planar workspace, wherein said inertial force is generated by oscillating an inertial mass approximately along said axis with respect to said housing, said inertial force transmitted through said housing to said user contacting said housing.

68. A tactile feedback mouse as recited in claim 67 wherein said inertial force is a periodic force provided by a periodic control signal.

* * * * *